(12) United States Patent  
McCarty et al.

(10) Patent No.: US 7,066,447 B2
(45) Date of Patent: Jun. 27, 2006

(54) SLEEVE VALVE WITH ADJUSTABLE FLOW CHARACTERISTICS

(75) Inventors: Michael W. McCarty, Marshalltown, IA (US); Ted A. Long, Sugarland, TX (US)

(73) Assignee: Fisher Controls International LLC., St. Louis, MO (US)

( * ) Notice: Subject to any disclaimer, the term of this patent is extended or adjusted under 35 U.S.C. 154(b) by 88 days.

(21) Appl. No.: 10/657,994

(22) Filed: Sep. 8, 2003

(65) Prior Publication Data

US 2004/0045603 A1 Mar. 11, 2004

Related U.S. Application Data

(63) Continuation-in-part of application No. 10/124,917, filed on Apr. 18, 2002, now Pat. No. 6,733,000.

(60) Provisional application No. 60/284,592, filed on Apr. 18, 2001.

(51) Int. Cl.
*F16K 51/00* (2006.01)
(52) U.S. Cl. .............. 251/344; 137/271; 251/360
(58) Field of Classification Search ........ 251/343–345, 251/235, 360–363; 137/269, 271
See application file for complete search history.

(56) References Cited

U.S. PATENT DOCUMENTS

| | | | | |
|---|---|---|---|---|
| 341,345 | A * | 5/1886 | Pickering | 137/271 |
| 1,477,722 | A | 12/1923 | Slattery | |
| 1,541,558 | A * | 6/1925 | Gade | 137/271 |
| 1,733,421 | A * | 10/1929 | Mauran | 251/360 |
| 2,278,313 | A | 3/1942 | Hornbostel | 251/8 |
| 2,454,160 | A * | 11/1948 | Greene | 137/271 |
| 3,322,138 | A | 5/1967 | Backman | 137/219 |
| 3,654,950 | A | 4/1972 | Hamm | 137/219 |
| 4,117,859 | A | 10/1978 | Illy | 137/219 |
| 4,470,549 | A | 9/1984 | McMillan et al. | 239/583 |
| 4,519,579 | A * | 5/1985 | Brestel et al. | 251/172 |
| 4,589,439 | A | 5/1986 | Steingass | 137/219 |
| 5,020,727 | A | 6/1991 | Smith | 239/526 |
| 5,161,738 | A | 11/1992 | Wass | 236/92 |
| 5,529,281 | A | 6/1996 | Brudnicki et al. | 251/129.03 |
| 5,853,023 | A * | 12/1998 | Orlandi et al. | 137/271 |
| 5,950,660 | A | 9/1999 | Hartman et al. | 137/219 |
| 6,047,734 | A * | 4/2000 | Robinson | 137/269 |
| 6,116,571 | A | 9/2000 | Hettinger | 251/129.2 |
| 6,361,018 | B1 | 3/2002 | Roth et al. | 251/129.2 |
| 6,604,542 | B1 * | 8/2003 | Bircann et al. | 137/269 |

FOREIGN PATENT DOCUMENTS

| | | |
|---|---|---|
| BE | 494 736 | 7/1956 |
| CH | 280611 | 1/1952 |
| DE | 896 140 | 10/1953 |
| DE | 951 691 | 10/1956 |
| DE | 199 60 330 A1 * | 5/2001 |
| GB | 791 118 | 2/1958 |

* cited by examiner

*Primary Examiner*—John Bastianelli
(74) *Attorney, Agent, or Firm*—Marshall, Gerstein & Borun LLP

(57) ABSTRACT

A sleeve valve has a valve body and a flow passage through the valve body. The flow passage has a longitudinal axis, a valve plug positioned therein, and a slidable sleeve received therein. The sleeve is movable in an axial direction between an opened and a closed position relative to the valve plug. An interchangeable first valve plug end portion is removably mounted to part of the valve plug in the flow passage. The first end portion is removable and replaceable with another second valve plug end portion to change at least one performance characteristic of the sleeve valve. The valve plug of the sleeve valve can be selectively interchanged with a plug selected to provide one or more desired performance or flow characteristics, whether to reduce the effects of wear or to change the valve performance.

21 Claims, 10 Drawing Sheets

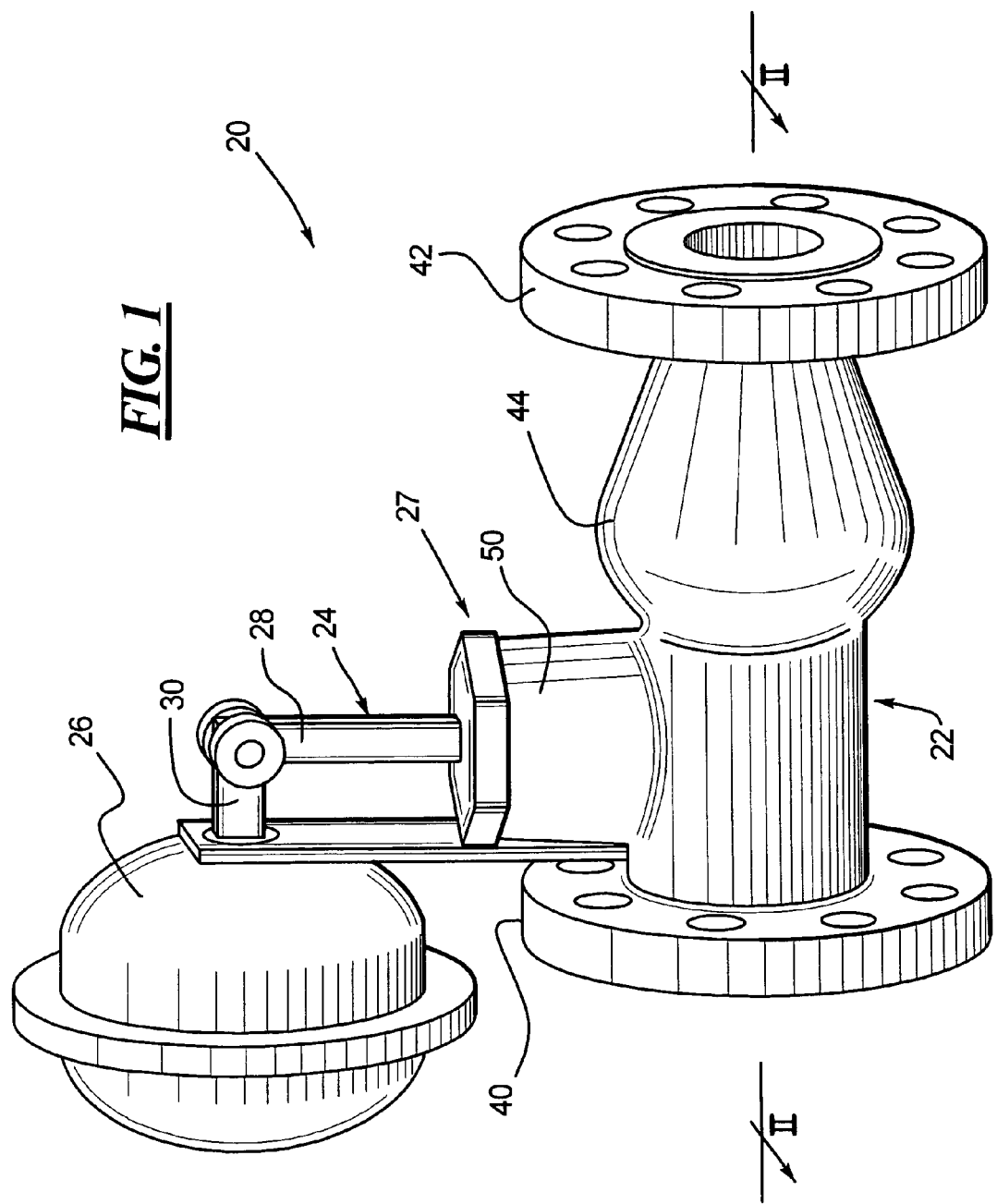

SLEEVE VALVE WITH ADJUSTABLE FLOW CHARACTERISTICS

RELATED APPLICATION DATA

This patent is a continuation-in-part of U.S. application Ser. No. 10/124,917, filed on Apr. 18, 2002, now U.S. Pat. No. 6,733,000 which is based on U.S. Provisional application Ser. No. 60/284,592, filed on Apr. 18, 2001.

FIELD OF THE INVENTION

The invention is generally related to axial flow valves, and more particularly to such a valve with adjustable flow characteristics and to a method of adjusting the flow characteristics of such a valve.

BACKGROUND OF THE INVENTION

Sleeve valves typically have a valve body defining an axial fluid flow passage. A stationary valve plug is commonly fixed within the valve passage and carries or defines a valve seat positioned on an upstream end of the plug. A slidable valve sleeve is positioned in the valve passage and can be selectively moved between a fully closed position with a downstream end of the sleeve borne against the valve seat and a fully opened position with the downstream sleeve end spaced a distance from the valve seat. Fluid can flow through the valve passage and the sleeve, around the valve plug, and exit an outlet of the valve.

This type of sleeve valve has a number of important performance characteristics such as fluid flow rate, fluid pressure, valve flow coefficient, as well as inherent, installed, and linear flow characteristic, among others.

Various flow characteristics can typically be determined or controlled by a number of factors including the size and shape or contour of the upstream end of the valve plug, the shape of the plug body beyond or downstream of the upstream end, and the passageway or orifice size and contour surrounding the valve plug. Other valve features can be designed and shaped to affect valve flow or performance characteristics as well, including contours of the valve sleeve outlet opening or the like. However, designing a particular valve plug shape is a common means to achieve a desired valve performance or flow characteristics.

A typical valve for a given system has a unique, non-replaceable valve sleeve and plug. If a different valve flow characteristic is desired for a particular valve or system, or if a valve seat or plug is damaged within a valve or system, it is necessary to remove and replace the entire valve assembly within the system. To change the flow characteristics or the valve plug, it has heretofore been necessary to swap the entire valve with a new or replacement valve.

Many valves used today are quite large, such as those used to control flow in massive water or petroleum pipelines. An ordinary valve in such a system can be several feet in diameter or larger. Substantially all of these large control valves are fabricated from steel and are thus extremely heavy and difficult to handle. If it is desired to repair or replace the valve plug of a sleeve valve for such a large fluid delivery system, the entire valve assembly must be removed and replaced. This requires that an entire new valve be transported to the sight and/or be readily available at the sight. This also requires that a number of valves be manufactured, assembled, and stored for use or transport when needed. Removing and replacing an entire valve can be very time consuming, costly, and labor intensive. Heavy equipment is usually required to lift out the damaged valve assembly and to drop in a replacement because of the size and weight of such valves. Significant system downtime can also result, especially where multiple valves require repair or replacement, such as to change system flow characteristics.

As indicated above, it is also sometimes desirable to change one or more valve performance or flow characteristics within a system in order to affect flow rates, to accommodate delivery of a different fluid, or other such reasons. Again, each valve of the system whose performance is to be altered must be replaced in its entirety, resulting in the same problems noted above.

Smaller scale fluid delivery systems also often utilize sleeve valves constructed as described above. It is sometimes desirable to change flow or performance characteristic, or to repair or replace components for these smaller valves and systems as well. Again, to adjust performance or flow characteristics or to repair a damaged valve assembly typically requires selecting an entire new valve and replacing the old valve with the new valve. This can be time consuming, require manufacture and storage of a number of different valves, and be rather costly, even for a smaller scale fluid delivery system and especially where multiple valves in the system are to be altered.

Also, each sleeve valve typically has predetermined performance characteristics based on the structural features of its valve components, such as the valve plug. To provide a valve having different performance characteristics requires manufacturing and assembling a valve with different components. A typical sleeve valve includes a valve body, a specific sleeve, a particular plug, and perhaps other components such as actuator parts that are each unique to the valve. Each separate part or component requires material and labor resources to fabricate the parts. Each valve must then be separately assembled, stored, and shipped by the valve manufacturer. A manufacturer, distributor and/or an end user must also store, catalogue, and maintain each valve assembly separately, if having a variety of valves with different flow or performance characteristics on hand is desired.

BRIEF DESCRIPTION OF THE DRAWINGS

Exemplary sleeve valves and methods in accordance with the teachings of the present invention are described and explained in greater detail below with the aid of the drawing figures in which:

FIG. 1 is a perspective view of one example of a sleeve valve constructed in accordance with the teachings of the present invention.

DETAILED DESCRIPTION OF THE PREFERRED EMBODIMENTS

It is one object of the present invention to provide a valve that solves one or more of the problems described above for conventional sleeve valves. It is another object of the present invention to provide a sleeve valve that can accommodate a plurality of different valve plug configurations. It is a further object of the present invention to provide a sleeve valve wherein the valve plug can be easily changed. It is a still further object of the present invention to provide a sleeve valve wherein the flow characteristics of the valve can be adjusted without having to substitute the valve with an entirely different valve. It is yet another object of the present invention to provide a sleeve valve wherein the pressure recovery, one example of an adjustable flow characteristic, can be adjusted by reconfiguring only the valve plug of the valve.

Figure 2A:
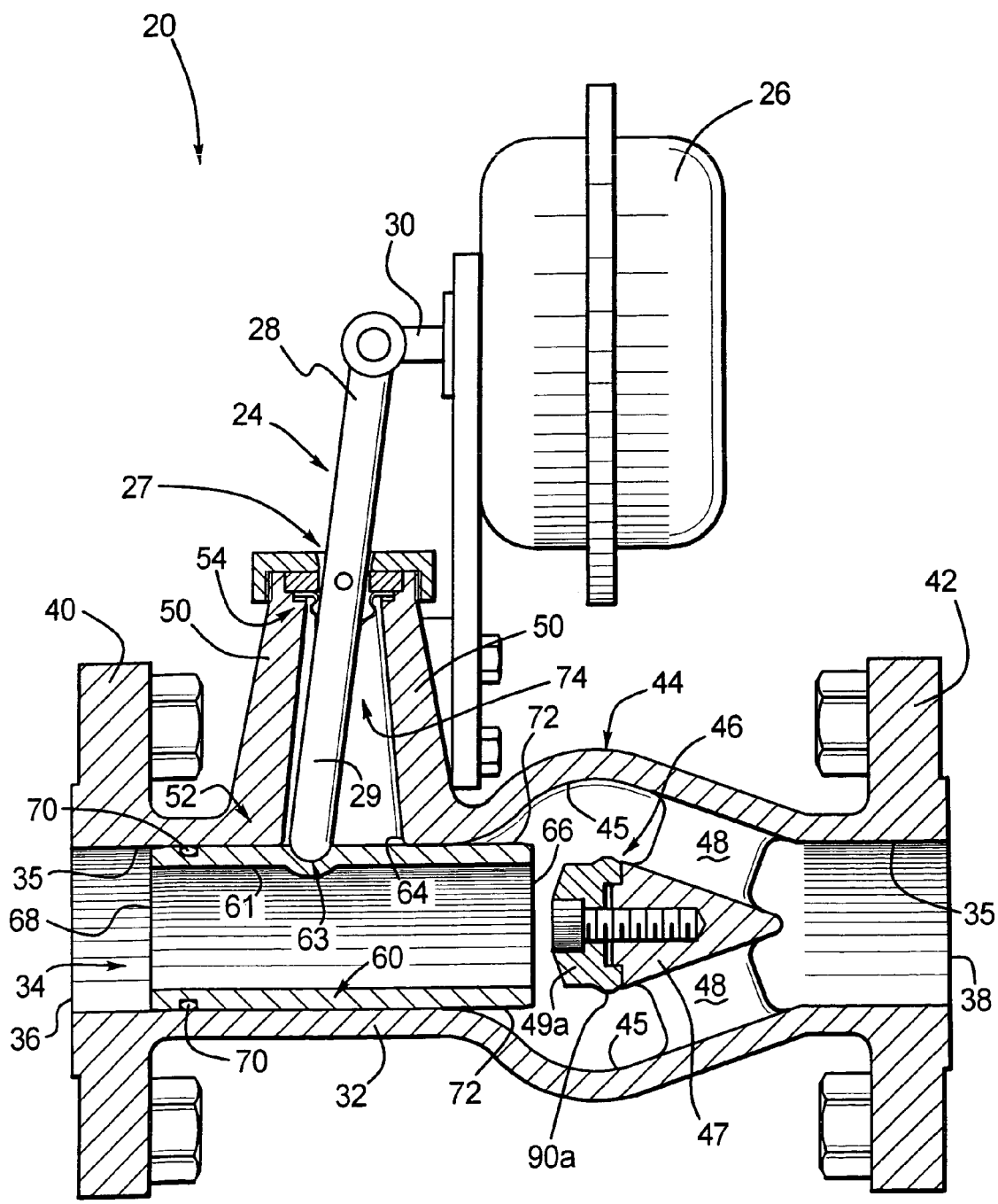
FIG. 2A is a longitudinal cross section taken along line II—II of the valve shown in FIG. 1 and shows the valve in an opened position.
Figure 2B:
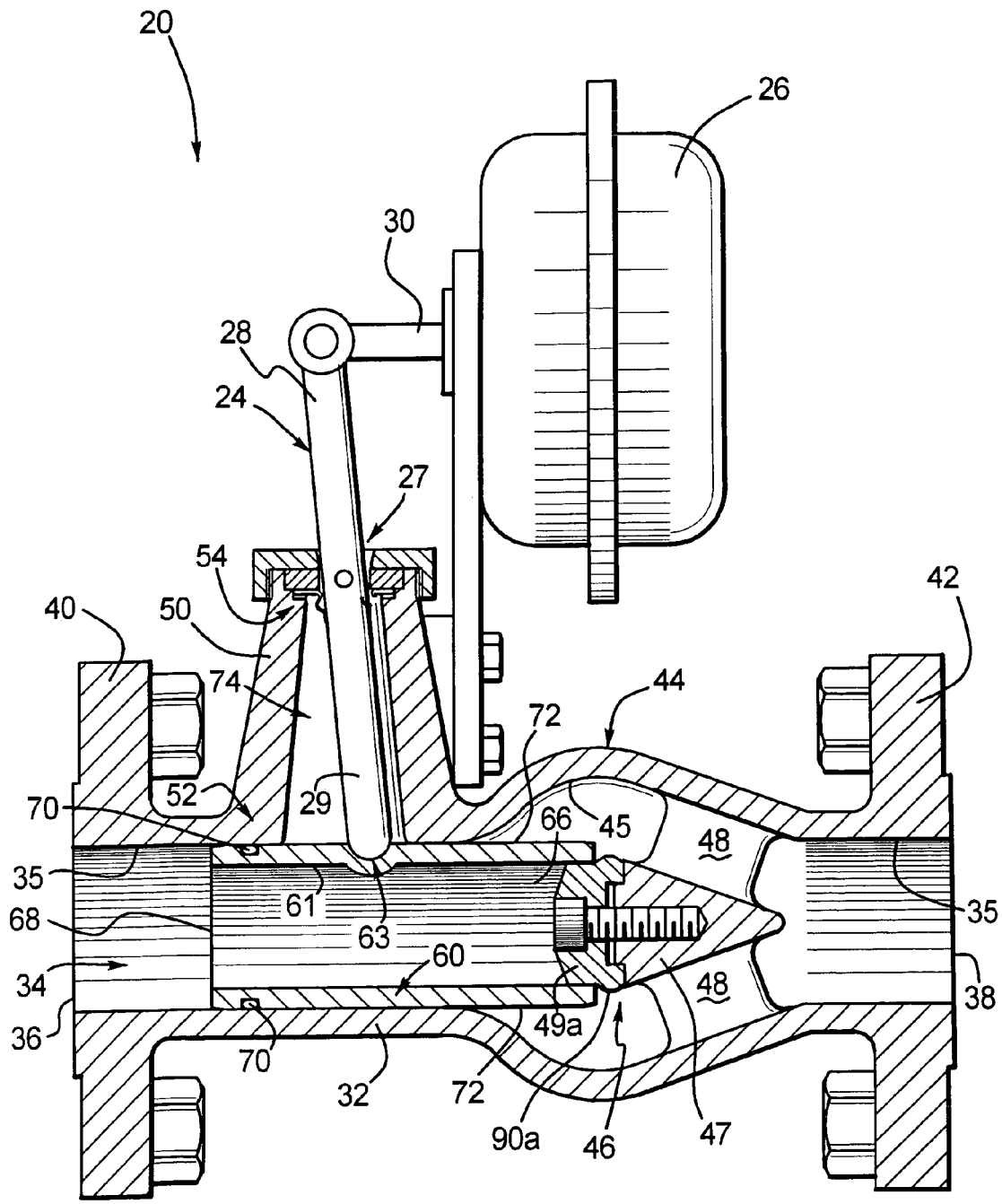
FIG. 2B illustrates the valve cross section similar to that shown in FIG. 2A, but with the valve in a closed position.

Referring now the drawings, FIGS. 1, 2A, and 2B illustrate one example of a sleeve valve 20 constructed in accordance with the teachings of the present invention. The sleeve valve 20 generally has a valve body 22 and a pivoting valve stem 24 for actuating the valve between opened and closed positions as described below. The valve stem 24, in one example, can be pivoted by an actuator 26 about a stem pivot 27. The actuator 26 is coupled to an upper stem section 28 of the valve stem 24 above the stem pivot 27. The stem 24, actuator 26, and stem pivot 27 can vary considerably and yet fall within the scope of the present invention, which is not intended to be limited by the particular construction of these components. In one example, the actuator 26 has a reciprocating rod 30 that can move axially according to movement of a diaphragm, electric motor, linkage, or the like, as desired for a particular application. As the actuator 26 moves the upper stem section 28, the stem 24 pivots about the pivot 27 and drives a lower stem section 29 to open and close the valve.

The valve body 22 generally has an elongate hollow section 32 defining a valve passage 34 that extends through and is defined by an interior surface 35 within the valve body between an inlet end and an outlet end of the body. The valve body 22 defines an inlet 36 to the passage 34 and an outlet 38 from the passage. The inlet end and the outlet end of the valve body 22 each also include, in this example, a radially outward extending mounting shoulder or flange 40 and 42, respectively, for securing the valve 20 in place within a desired apparatus or system. Both the inlet and outlet flanges 40 and 42 can vary in size, configuration, and mounting particulars as needed for a particular system or use of the sleeve valve 20.

In this example, a portion of the hollow section 32 of the valve body 22 defines an annular bulge 44 extending radially outward from the hollow section 32. The bulge 44 produces an increased diameter section 45 within the valve passage 34 that encompasses a stationary valve plug 46. The valve plug 46 is positioned axially within the passage 34 to coincide longitudinally relative to the bulge 44 and axially relative to the passage section 45.

The valve plug 46 has a plug body 47 that is held stationary within the passage 34, in this example, by one or more material webs 48 that extend radially between the passage surface 35 and the plug body 47. In prior known valves of this type, the entire valve plug 46 and the webs 48 are integrally formed as a unitary part of the valve body 22 within the passage 34. In the disclosed examples, only the plug body 47 of the valve plug 46 is fixed in place. An upstream end portion identified generically as end portion 49 (described in greater detail below as various selectable end portions 49a–f) of the valve plug 46 is removably secured in place. Thus, at least the end portion 49 of the plug 46 can be removed and replaced as desired to reconfigure the valve plug to change flow characteristics of the valve 20.

In general, the size of the valve plug 46 and the flow characteristics desired, as well as the size of the available end portions 49, will determine the size of the bulge 44 and increased diameter passage section 45. The general cross sectional flow area of the passage 34 downstream of the valve plug (nearer the outlet 38) and the cross sectional flow area of the passage within the increased diameter section 45 (around the plug 46) is preferably greater than or equal to the cross sectional flow area of the passage upstream of the valve plug (nearer the inlet 36). This is done to insure that fluid flow is not restricted by the valve body, but only at the desired throttling area about the sleeve and plug. The bulge 44 and passage section 45 provide the additional cross sectional flow area for the passage 34 around the valve plug 46 to accomplish this goal.

To seal the valve 20 as the sleeve is reciprocated, the valve body 22 has an integral stem housing 50 extending radially outward from the hollow section 32. The stem housing 50 has a base 52 either integrally formed as part of the hollow section 32 of the valve body 22, or, if desired, attached and fluidly sealed thereto. The stem housing 50 extends radially outward and terminates at a pivot end 54 opposite the base 52. The stem housing 50 assists in defining the stem pivot 27 for the stem 24 at or near the pivot end 54. The stem housing 50 is therefore necessarily substantially rigid to maintain a fixed pivot point for the stem.

The sleeve valve 20 also includes a slidable sleeve 60 in the form of an annular or cylindrical tube. The sleeve 60 has an interior surface 61 that defines a flow passage through the sleeve. The sleeve 60 is received coaxially within the passage 34 and is adapted for sliding into and out of engagement with the stationary valve plug 46. The lower stem section 29 of the stem 24 is pivotally connected to the sleeve 60 at a drive connection 63. The lower stem section 29 drives the sleeve axially within the passage 34 between an opened position, as shown in FIG. 2A, and a closed position, as shown in FIG. 2B. The lower stem section 29 is pivotally coupled to the sleeve 60 for driving the sleeve axially within the passage 34. The lower stem section 29 passes through an opening 64 defined within the base 52 and the hollow section 32. The opening 64 can be a linear slot permitting only linear, axial movement (relative to the sleeve sliding direction) of the lower stem section 29. Alternatively, the opening 64 can be an opening through the hollow section 32 that is shaped to coincide with the entire footprint of the base 52 of the stem housing 50. The opening can also be other sizes and shapes as desired.

As shown in FIG. 2A, the sleeve 60 is positioned in the opened position. The sleeve 60 has a downstream end 66 generally facing the outlet 38 of the passage 34. The sleeve 60 also has an upstream end 68 generally facing the inlet 36 of the passage. In the opened position, the downstream end 66 is spaced a distance from the stationary end portion 49 of the valve plug 46 permitting fluid to freely pass through the passage 34 and the sleeve 60, to flow around the valve plug, and to exit the outlet 38 of the passage. FIG. 2B illustrates the sleeve 60 in the closed position wherein the downstream end 66 abuts and seals against either the end portion 49 of the stationary valve plug 46, or another portion of the plug 46. An additional seal aid (not shown) can be provided on either the sleeve downstream end 68, the plug 46, or the end portion 49 to assist in creating a fluid tight seal in the closed position. Fluid is prevented from passing to the outlet 38 of the passage 34 when the sleeve 60 is in the closed position.

If desired, one or more annular sleeve seals 70 can be provided surrounding the exterior of the sleeve 60. The seals 70, if provided, can create a fluid tight, or at least a fluid inhibiting, seal between the interior surface 35 of the passage 34 and an exterior surface 72 of the sleeve 60. The seals 70 can be in the form of an O-ring received in a seal groove (not shown) in the sleeve surface 72. Depending upon the longitudinal length of the sleeve 60, the sleeve can prevent fluid from passing through the opening 64 into an interior 74 of the stem housing 50, whether in the opened or the closed orientation.

Fluid tight seals 70 can be used to prevent fluid from entering the interior 74 of the stem housing 50. If the sleeve seals 70 are simply fluid inhibiting seals, some fluid may pass into the interior 74 of the stem housing. With such a construction, it is preferable to further seal between the stem 24 and the pivot end 54 of the stem housing in order to prevent any fluid from escaping the valve 20. With either type of seal 70, it is preferred that no process fluid leak downstream to the outlet 38, bypassing the sleeve 60, until the sleeve is released from the plug 46. Various types of sleeve seals 70 are known to those of ordinary skill in the art and can be utilized without departing from the scope of the invention.

Figure 3:
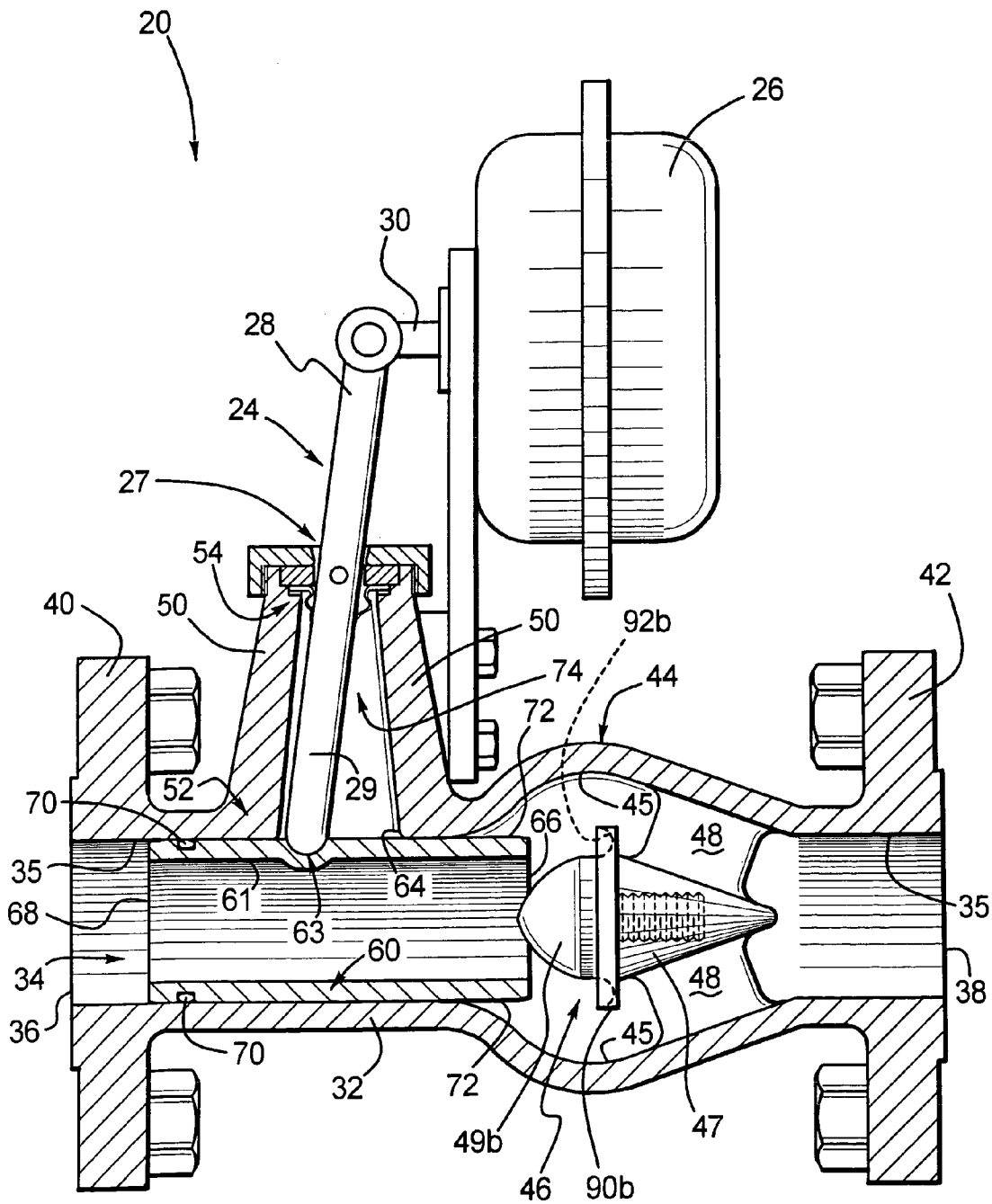
FIG. 3 shows the valve of FIG. 1 with an alternative valve plug configuration mounted within the valve.
Figure 4:
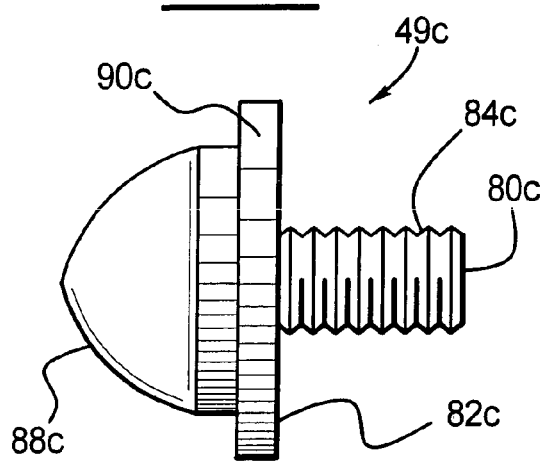
FIG. 4 is a side view of another alternative valve plug configuration for use with the sleeve valve shown in FIG. 1.

In accordance with the teachings of the present disclosure, FIGS. 2A and 2B illustrate the valve 20 with one example of a valve plug end portion 49a installed on the plug body 47. FIG. 3 illustrates the valve 20 with another example of a valve plug end portion 49b installed on the plug body 47. FIG. 4 illustrates yet another example of an end portion 49c uninstalled, and similar to the end portion 49b. FIGS. 5–8 illustrate additional examples of different and uninstalled end portions 49d, 49e, 49f, and 49g. Each of the end portions 49a–g is intended only to illustrate several of many possible configurations of valve plug ends. Each of the end portions 49 disclosed herein is removable and replaceable with one of the other disclosed end portions or yet other end portions not shown herein. Changing the end portion within the valve can be utilized to alter valve performance or flow characteristics.

Depending upon the shape and size of the upstream surface 88 of the installed end portion 49, and depending upon the sleeve position or travel, valve flow characteristics can be varied. Fluid flowing over the upstream end will be diverted and directed according to the contours of the end portion 49. Each end portion 49 can be designed to provide different characteristics both at each particular opened position or travel distance of the sleeve, and for a fully opened sleeve. Therefore, without having to swap out an entire valve, valve performance can be altered as desired simply by selecting and installing a selected end portion, such as one of the end portions 49a–g.

The flow within the vena contracta or narrowest flow point of the valve 20 can be controlled and changed simply by positioning the sleeve 60 in a particular opened position relative to the end portion 49. Thus, by moving the sleeve 60, and by installing a selected end portion 49, valve performance or flow characteristics can be controlled or adjusted.

One example of an adjustable valve performance or flow characteristic is commonly known as valve pressure recovery. Pressure recovery or the pressure recovery factor $F_1$ generally is a ratio between the pressure recovered downstream of the vena contracta (narrowest flow point) and the pressure drop at the vena contracta. In other words, it is the measure of an amount of fluid pressure recovered between the vena contracta and the valve outlet. Three factors are important in determining pressure recovery for this type of valve. One is the inlet pressure ($P_1$) measured upstream of the vena contracta or narrowest part of the flow passage. The second is the outlet pressure ($P_2$) of the valve. The third is the pressure drop ($\Delta P$) between the inlet pressure ($P_1$) and the lowest fluid pressure of the valve measured at the vena contracta.

The pressure recovery factor $F_1$, as noted above, is a function of the pressure recovery and is a variable that can be used and controlled in fluid systems to achieve desired system capabilities. The pressure recovery factor $F_1$ is a ratio between the pressure recovered downstream of the vena contracta and the pressure drop at the vena contracta.

$$F_1 = \sqrt{[\Delta P / P_d]}$$

A number of factors are important in determining pressure recovery of this type of valve. One is the inlet pressure ($P_1$) measured upstream of the vena contracta, such as at the valve inlet 36. Another is the outlet pressure ($P_2$) of the valve at the outlet 38. Yet another is the pressure drop ($P_d$) at the vena contracta, $$P_d = P_1 - P_{vc}$$

or the difference between the inlet pressure ($P_1$) and the lowest fluid pressure of the valve measured at the vena contracta ($P_{vc}$) at the narrowest point of the valve. Still another is the pressure drop ($\Delta P$), $$\Delta P = P_1 - P_2$$

or the pressure difference between the inlet end and the outlet end of the valve 20. The pressure recovery factor $F_1$ is simply the square root of the ratio of $\Delta P / P_d$. The present disclosure provides a simple, efficient, and low cost means to alter flow characteristics, including pressure recovery, of a given valve 20 simply by changing the end portion 49 of the valve. By doing so, pressure drop across the valve, the pressure recovery factor $F_1$, the pressure drop at the vena contracta, as well as other flow characteristics can be altered significantly.

Figure 9:
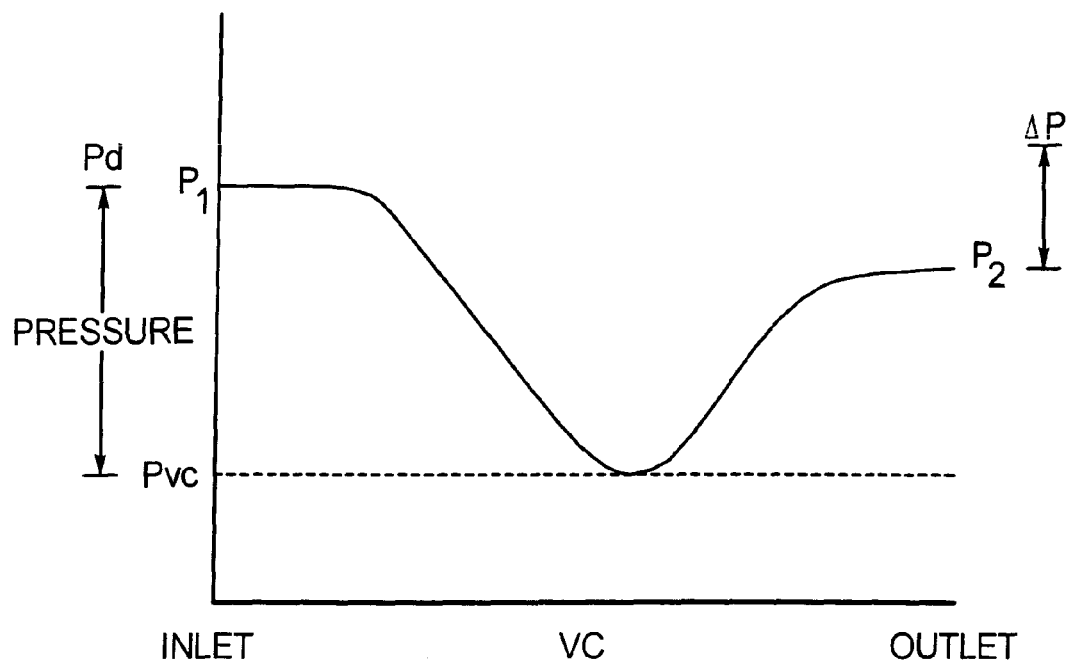
FIG. 9 is a graph of one example of an adjustable flow characteristic, valve pressure recovery performance, for a valve including a valve plug such as that shown in FIG. 1.
Figure 10:
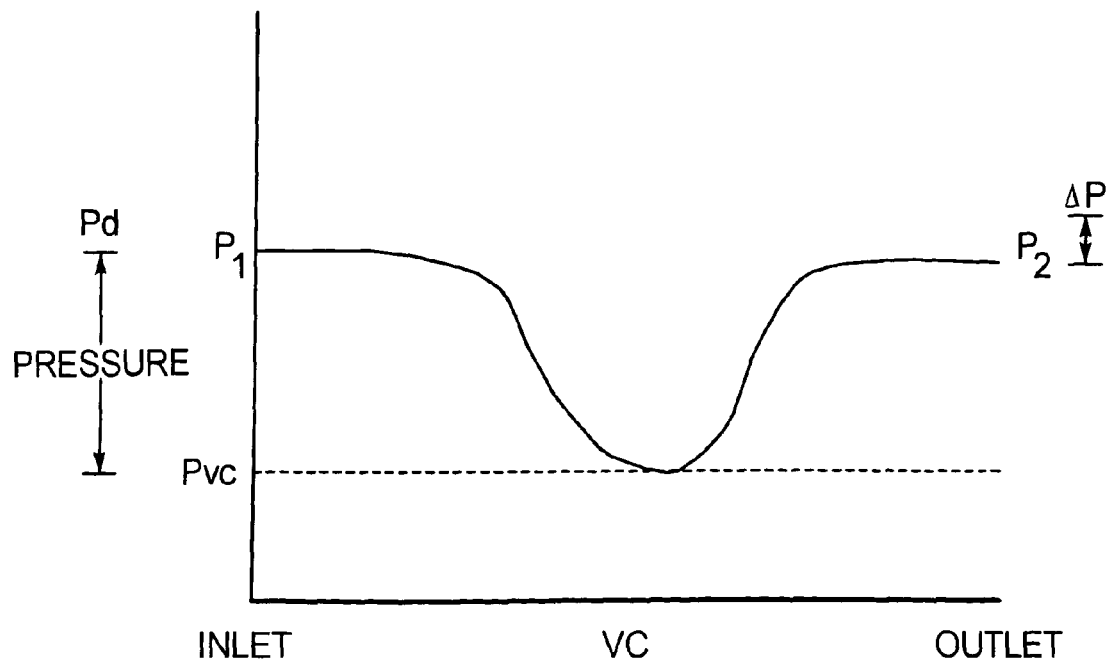
FIG. 10. is a graph of another example of an adjustable flow characteristic, valve pressure recovery performance, for a valve including a valve plug such as that shown in FIG. 2.

To further illustrate pressure recovery as one possible adjustable flow characteristic, FIGS. 9 and 10 depict two plots of many possible examples of valve pressure recovery that can be achieved simply by utilizing a different end portion 49. As will be evident to those having ordinary skill in the art, many other valve pressure recovery performance curves can be achieved, other than those depicted in FIGS. 9 and 10. Referring to FIGS. 9 and 10, the graphs plot pressure vs. a given location in the valve, each graph for a different end portion 49. As can be seen, the plot of FIG. 9 shows a large pressure drop $P_d$ from the inlet to the vena contracta, and a relatively low pressure recovery $\Delta P$ between the inlet and the outlet. The plot of FIG. 10 shows a lower pressure drop $P_d$ between the inlet and the vena contracta, but a higher pressure recovery $\Delta P$ for the valve.

To render the valve 20 adjustable, in one example shown in FIGS. 3–8, the valve plug body 47 of the end portion 49c has a threaded stem 80c extending from a rear side 82c of the end portion. The threaded stem 80c includes a plurality of male threads 84c thereon in this example. The plug body 47 (see FIG. 3) thus includes a corresponding blind bore 86 with female threads (not specifically shown) that correspond to the male threads 84c. The end portion 49c can be threaded and secured in place on the plug body 47 by inserting the stem 80c into the bore 86 and rotating the end portion. Removal of the end portion is similarly performed by rotating the end portion 49c in a reverse direction. In this manner, the end portion 49c can be installed, removed, and replaced as desired. As shown in FIGS. 5–8, for example, each of the end portions 49a–49g has a corresponding stem 80a–80g, rear side 82a–82g, and threads 84a–84g, respectively.

Each end portion 49a–g, for example, also has a different front or upstream facing surface 88a–88g with a unique shape and configuration. Thus, a particular upstream surface, such as the surface 88c of the end portion 49c, can be provided and selected to create desired flow characteristics over the valve plug 46 for the valve 20. Additionally, some of the end portions 49, such as the portions 49a, 49b, 49c, 49d, and 49g, have a flow diverting collar or flange section 90a, 90b, 90c, 90d, or 90g, respectively. The size and contour of the flange 90 can vary considerably as desired to achieve particular flow characteristics.

For example, the end portion 49a shown in FIGS. 2A and 2B has a non-rounded surface 88a and a slightly protruding flange or collar section 90a. This type of end portion surface and flange configuration would redirect flow relatively abruptly over the surface 88a because it has a sharp angled feature, but would redirect flow very little over the flange 90a. Consistent with the pressure recovery flow characteristic, the end portion 49a in this example would result in the valve 20 having a relatively medium pressure loss at the vena contracta, and a relatively medium pressure recovery at the outlet.

As shown in FIG. 3, the end portion 49b has a relatively large flange 90b, and has a recessed, forward facing groove 92b formed in the flange. The end portion 49b would redirect flow relatively smoothly over the smooth curved surface 88b, but would greatly redirect flow over the flange 90b and groove 92b. The end portion 49b would result in the valve 20 having a very high pressure loss and a very low pressure recovery.

Figure 5:
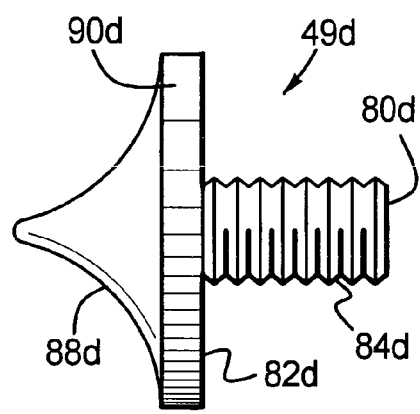
FIG. 5 is a side view of another alternative valve plug configuration for use with the sleeve valve shown in FIG. 1.

FIG. 4 illustrates an end portion 49c that is similar to the end portion 49b, except that the flange 90c does not have a groove. This end portion 49c would result in the valve having a relatively high pressure loss and a relatively low pressure recovery. FIG. 5 illustrates an end portion 49d with a concavely curved surface 88d that transitions into a solid or non-grooved flange 90d. This end portion would result in the valve 20 having a slightly lower pressure loss and a lightly greater pressure recovery than the end portion 49c, because the portion 49d has a more gradual transition between the surface 88d and the flange 90d.

Figure 6:
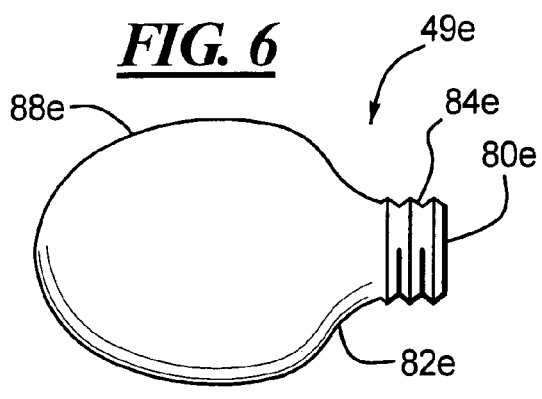
FIG. 6 is a side view of another alternative valve plug configuration for use with the sleeve valve shown in FIG. 1.
Figure 7:
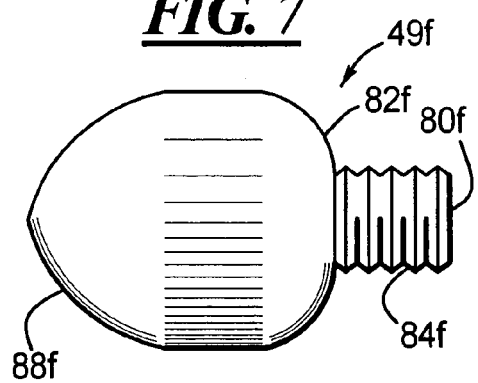
FIG. 7 is a side view of another alternative valve plug configuration for use with the sleeve valve shown in FIG. 1.

FIGS. 6 and 7 illustrate variations on globe valve end portions 49e and 49f, respectively. These end portions have no flow redirecting flanges 90. The end portion 49f has a more smooth, gradual transition at the rear side 82f than the rear side 82e of the portion 49e. Each will result in the valve 20 having a relatively low pressure loss and relatively high recovery. The end portion 49f, because of the smoother rear side 82f, will result in slightly lower pressure loss and slightly higher pressure recovery than the portion 49e.

Figure 8:
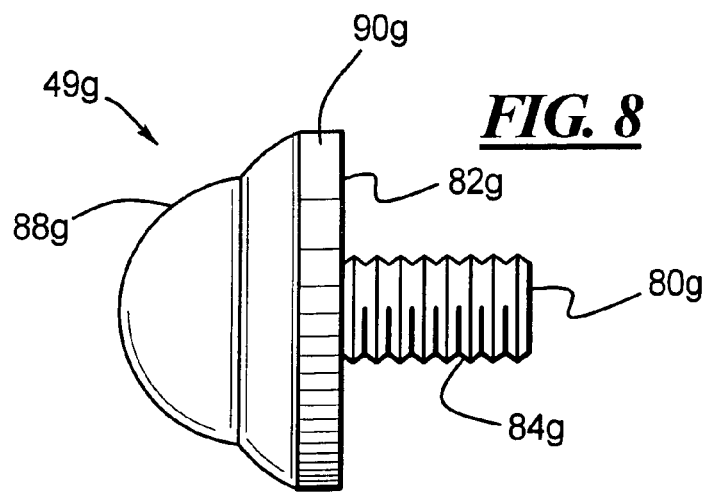
FIG. 8 is a side view of another alternative valve plug configuration for use with the sleeve valve shown in FIG. 1.

FIG. 8 illustrates an example of an end portion 49g having a semi-spherical surface 88g that transitions only slightly into a smoothly curved flange section 90g. The flange section 90g abruptly terminates at a flat rear side 88g that is nearly perpendicular to the end of the flange 90g. This type of end portion is intended to promote choking of the valve 20 earlier than other types of end portions. Controlling the valve open position controls the mass flow of fluid through the valve. Choking of a valve occurs when the ratio of the pressure difference between the inlet end 36 and the outlet end 38 ($\Delta P$) over the inlet end 36 pressure ($P_1$) becomes constant, where $\Delta P = P_1 - P_2$, and Choking: $\Delta P / P_1$ = constant regardless of valve open position. Utilizing the end portion 49g will promote choking of the valve 20 at a smaller opened position than other types of end portion configurations and result in a constant ratio $\Delta P/P_1$ over the remaining sleeve travel to a fully opened position.

In some embodiments of the valve 20, it may also be desirable to remove the valve plug end portion 49 to service the component for wear. Removably installing the plug end portion 49 as described above will permit such service or replacement.

An array of available end portions from which to select can be provided for a given single valve 20. A user can select the desired valve end portion 49 from the array in order to achieve specific flow characteristics. A user can also replace a worn end portion 49 by selecting an identical one from the array.

Figure 11:
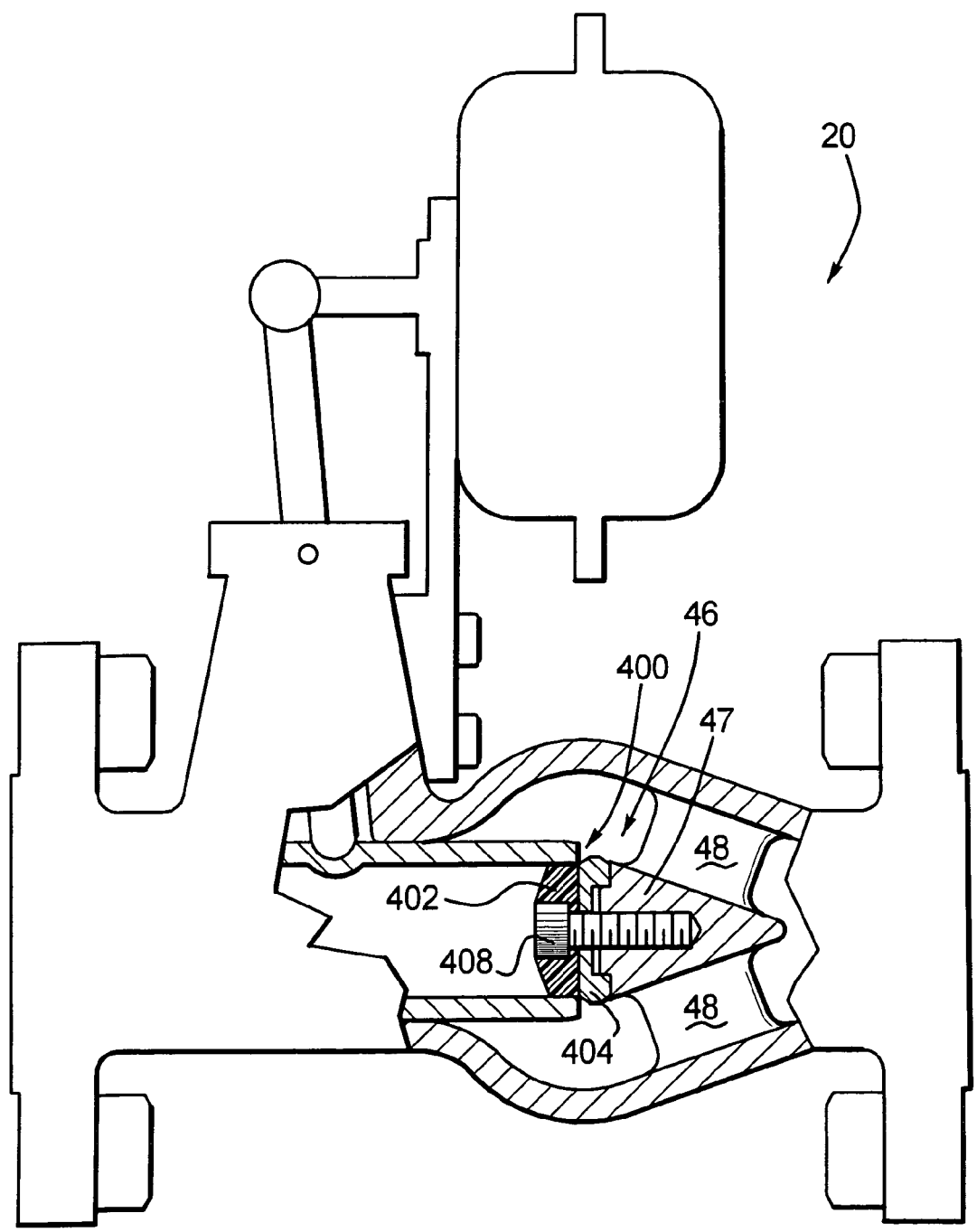
FIG. 11 shows the valve of FIG. 1 with an alternative valve plug configuration installed in the valve.

FIGS. 11–14 disclose several alternative examples of the replaceable valve plug end portions 49 and sleeve seal arrangements to achieve different valve performance or flow characteristics. Special service valve plugs, such as for noise attenuation, cavitation protection, or "soft seat" (TEFLON®) seal provision can require such service or replacement. The portions of the valve plug 46 as described above can be removably installed in the passage 34 permitting service or replacement of such valve designs. FIG. 11 shows the valve 20 with a valve plug 46 having an added soft seat construction. The plug 46 includes a replaceable tip 400 having a plastic or elastomeric seat 402 received over the upstream end of the plug 46. The seat 402 is held in place on the plug body 47 by a retainer 404 and using a fastener 408. The seat material can be selected to meet certain material standards and/or tight seating characteristics.

Figure 12:
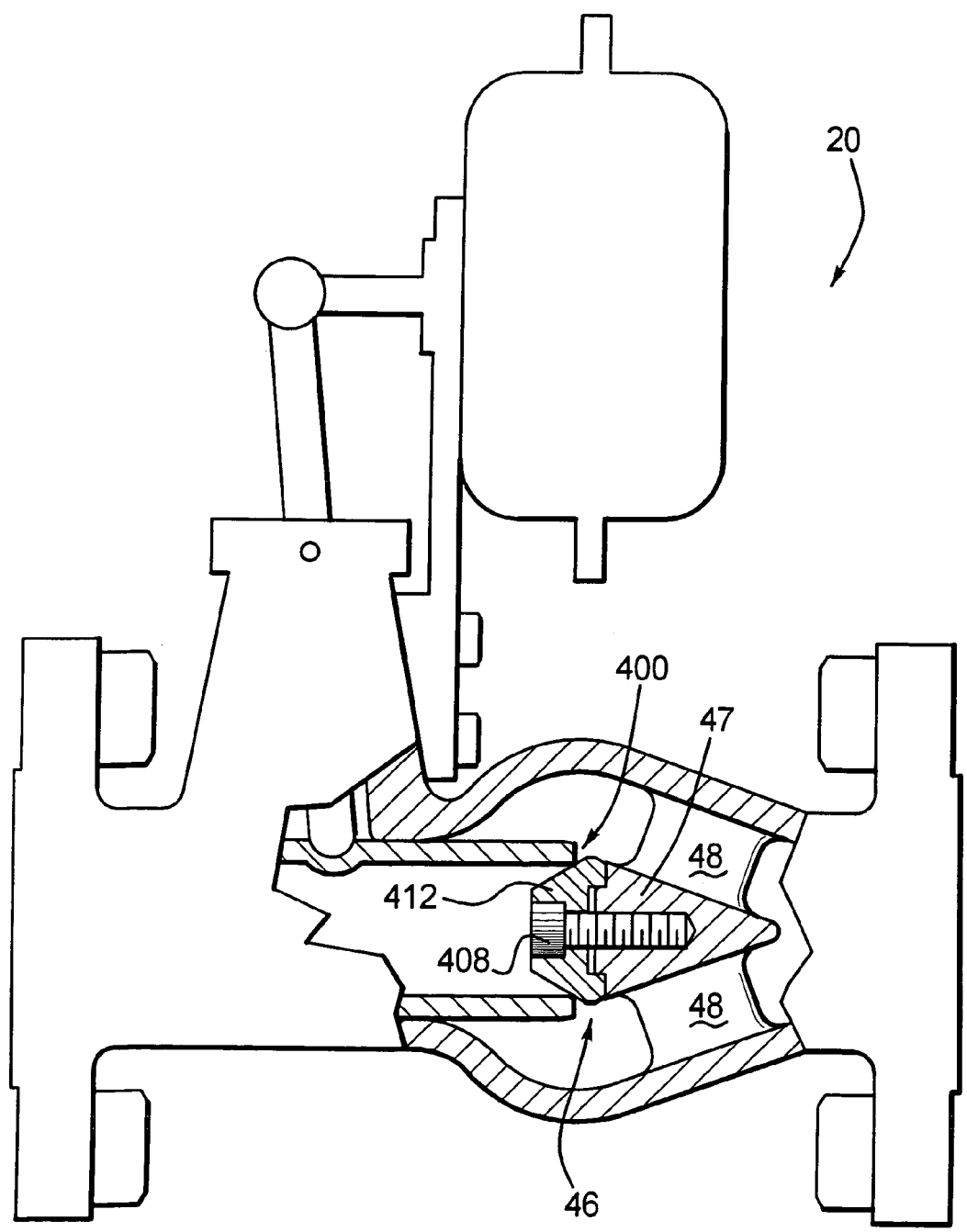
FIG. 12 shows the valve of FIG. 1 with yet another example of an alternative valve plug configuration installed in the valve.

FIG. 12 shows an alternative replaceable end portion 410 having an angled but linear upstream surface 412 of a different configuration and again held in place by the fastener 408. The tapered or angled surface 412 may be desired to provide still different process fluid flow and valve performance characteristics.

Figure 13:
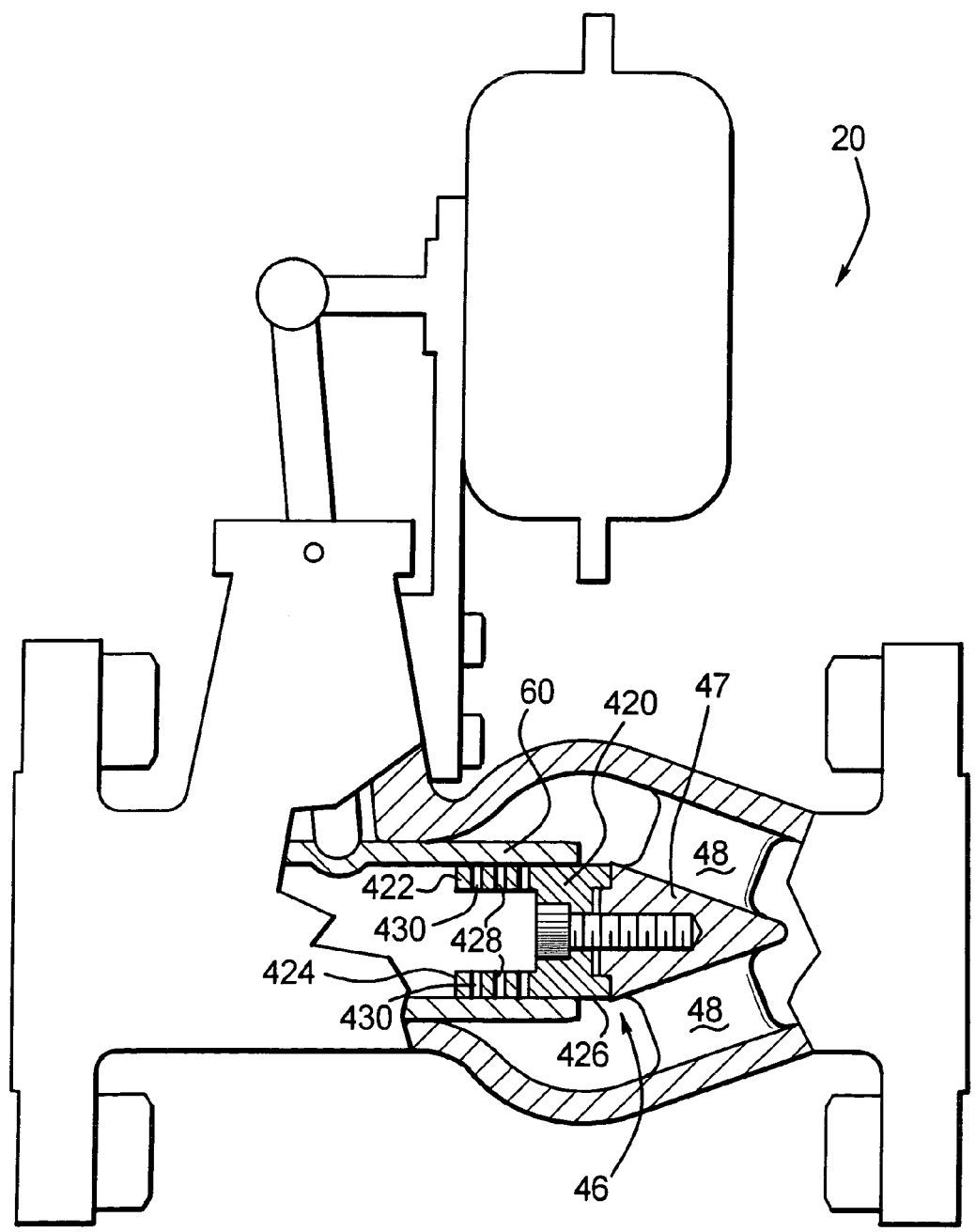
FIG. 13 shows an alterative sleeve valve constructed in accordance with the teachings of the present invention and having adjustable flow capabilities integrally provided in the sleeve and plug arrangement.

FIG. 13 shows another example of an alternative valve plug 46 including yet another example of an attachment fitting or end portion 420. The plug end portion 420 has a cylindrical configuration with a center bore 422, an annular wall 424, and an exterior surface 426. The exterior surface 426 has a diameter such that it can be received and closely fit within the interior of the sleeve 60. A first set of radial openings 428 are provided and spaced apart circumferentially around the plug end 420. A second set of openings 430 are also provided circumferentially around the plug end 420, but longitudinally spaced upstream from the first set 428. Additional sets of openings can also be provided as desired. The openings 428 are exposed and opened first during travel of the sleeve 60 toward the inlet end (open position).

Process fluid can first pass only through the openings 428. As the sleeve is moved further toward the open position, the next set or sets of openings 430 become sequentially open. The sleeve and plug can be design to only expose the radial openings when the sleeve is in the fully open position. Alternatively, the outlet end of the sleeve can release and move further away from the end portion 420 when in the opened position to permit free flow through the sleeve and around the entire plug 420. By this example, still further alternative flow characteristics can be achieved as desired, depending upon the position of the sleeve relative to the plug.

Figure 14:
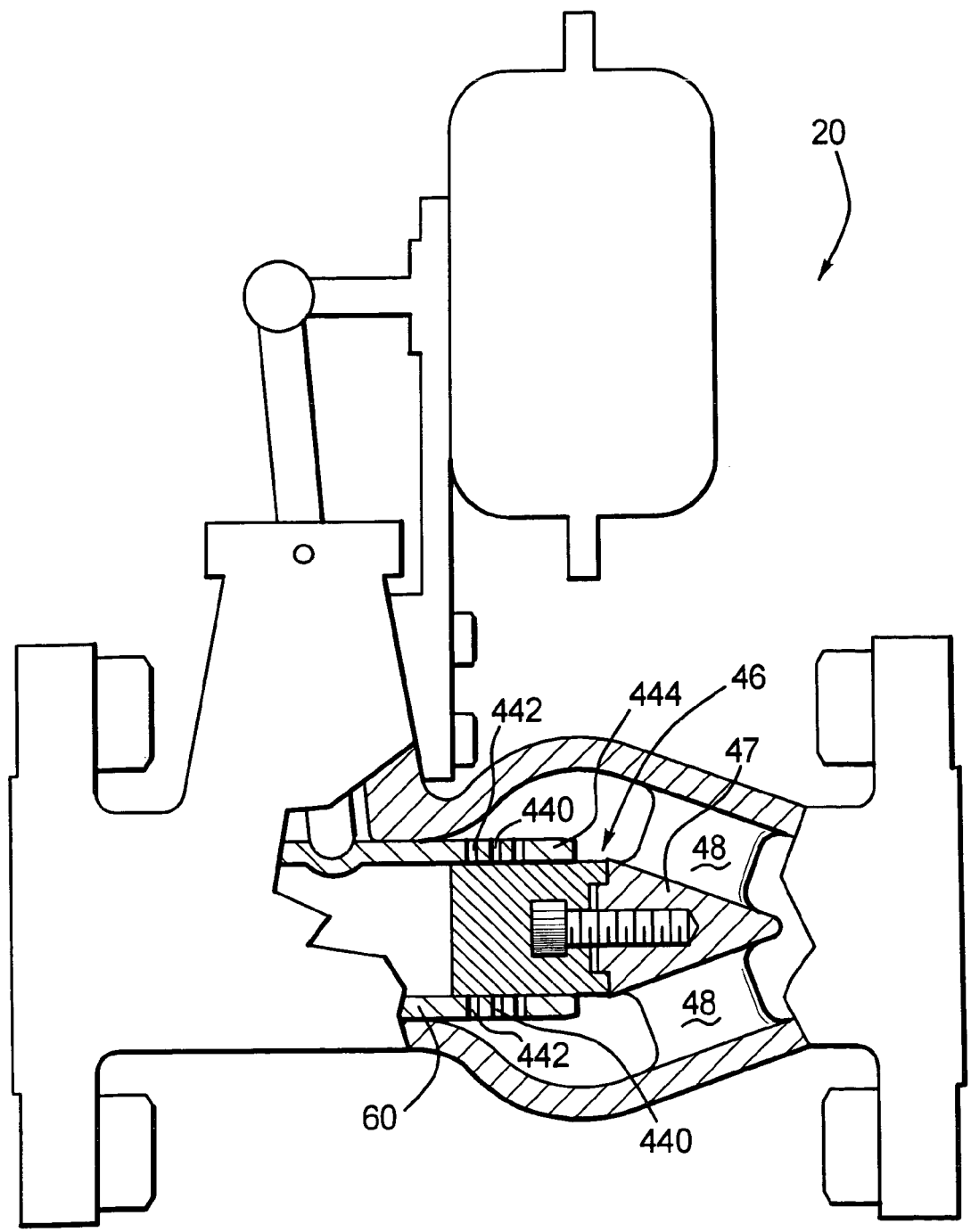
FIG. 14 shows another alterative sleeve valve constructed in accordance with the teachings of the present invention and having adjustable flow capabilities integrally provided in the sleeve and plug arrangement.

FIG. 14 shows a similar plug end portion and sleeve configuration except that radial openings 440 and 442 are formed in the sleeve near its outlet end. A plug fitting or end 444 in this example is a solid cylinder adapted to be received in and closely fit the interior of the sleeve. The solid plug will sequentially open or close off the openings 440 and 442, depending upon the sleeve position within the passage.

The examples of FIGS. 3–8 illustrate end portions with integral threaded stems 80 extending therefrom. The examples of FIGS. 2A, 2B, and 11–14 illustrate end portions having openings for receiving a conventional fastener therethrough. The fastener is passed through the opening in the end portion and threaded into the stationary valve body portion 47. Other removable fastening means, or the reverse configuration (i.e., the stem or fastener threads into the removable end portion and extends from or passes through the body portion 47) of those illustrated can also be utilized to secure the replaceable end portions to the stationary portions 47.

Though not specifically shown or described herein, the entire valve plug 46 may be removable and replaceable within the valve passage 34. Different arrangements for mounting and securing the plug 46 can be utilized to accomplish same. The material webs 48 may include attachment features permitting the plug 46 to be removably attached thereto. Alternatively, the plug 46 and webs 48 can be structured such that they can be removed and replaced within the valve passage 34 as a unitary assembly. In any case, the valve plug 46 can have particular flow controlling characteristics, and a plurality, set, or array of different, replaceable, and fully removable plugs can be provided.

Although certain methods and axial flow valve have been disclosed and described herein in accordance with the teachings of the present invention, the scope of coverage of this patent is not limited thereto. On the contrary, this patent covers all embodiments of the teachings of the invention fairly falling within the scope of the appended claims, either literally or under the doctrine of equivalents.

What is claimed is:

1. A sleeve valve comprising:
a valve body;
a flow passage through the valve body, the passage having a longitudinal axis;
a slidable sleeve received in the flow passage and movable in an axial direction between an opened and a closed position;
a valve plug positioned within the flow passage and arranged to cooperate with the slideable sleeve to open or close the sleeve valve;
a first end portion of the valve plug having an upstream flow directing surface, the first end portion being removably mounted to a part of the valve plug within the flow passage; and an alternative second end portion, from a plurality of end portion options, removably mounted to the part of the valve plug, wherein the second end portion replaces the first end portion to change at least one performance or flow characteristic of the sleeve valve.

2. A valve according to claim 1, wherein a valve pressure recovery performance characteristic of the sleeve valve can be changed by interchanging at least the first end portion with the second end portion.

3. A valve according to claim 1, wherein the valve plug has a body section fixed in position within the flow passage, and wherein only the end portion is removable and replaceable relative to the body section.

4. A valve according to claim 3, wherein the first end portion and the second end portion are each selected from a plurality of interchangeable end portions.

5. A valve according to claim 4, wherein each of the plurality of interchangeable end portions has at least one different size or shape characteristic in comparison to the other of the plurality of interchangeable end portions.

6. A valve according to claim 4, wherein each of the plurality of interchangeable end portions has a different upstream surface contour in comparison to the other of the plurality of interchangeable end portions.

7. A valve according to claim 4, wherein at least two end portions of the plurality of interchangeable end portions have a flow redirecting flange, and wherein each of the at least two end portions has a different contoured flow redirecting flange in comparison to the other of the at least two end portions.

8. A valve according to claim 1, wherein the flow passage has a generally circular cylindrical cross section at least in a sleeve engaging region.

9. A valve according to claim 8, wherein the slidable sleeve has a circular cylindrical cross section and is received in the sleeve engaging section of the flow passage.

10. A valve according to claim 5, wherein the at least one valve performance or flow characteristic is a valve pressure recovery performance characteristic which is different for each of the plurality of end portions.

11. A valve according to claim 1, wherein each of the first and second end portions is removably installed within the flow passage using a discrete threaded fastener.

12. A valve according to claim 1, wherein each of the first and second end portions includes a threaded stem extending from a downstream end of the corresponding end portion for removable and threaded installation onto a stationary valve plug body supported within the flow passage.

13. A method of adjusting at least one performance or flow characteristic of a sleeve valve wherein the valve has a valve body, a flow passage through the valve body, a valve plug in the flow passage, and a slidable sleeve movable along an axis of the flow passage between an opened and a closed position relative to the valve plug, the method comprising the steps of:
removing at least a first end portion having an upstream flow directing surface from a part of the valve plug;

selecting an alternative second end portion from a plurality of end portion options; and removably installing the second end portion on the part of the valve plug in the flow passage.

14. A method according to claim 13, and suitable for adjusting a valve pressure recovery performance characteristic of the valve.

15. A method according to claim 13, wherein the step of removing further comprises:

releasing the first end portion by removing at least one fastener that secures the first end portion in place.

16. A method according to claim 13, wherein the step of removing further comprises:

rotating the first end portion in order to release a threaded stem from the part of the valve plug, the stem extending from a downstream end of the first end portion.

17. A method according to claim 13, wherein the step of removably installing further comprises:

placing the second end portion adjacent the part of the valve plug; and reinstalling a threaded fastener to secure the second end portion in place.

18. A method according to claim 13, wherein the step of removably installing further comprises:

placing the second end portion adjacent the part of the valve plug; and rotating the second end portion in order to insert a threaded stem into the part of the valve plug, the stem extending from a downstream end of the second end portion.

19. A method according to claim 13, wherein the step of selecting further comprises:

selecting the second end portion from an array of end portions each having one or more different physical characteristics relative to the other end portions of the array.

20. An adjustable sleeve valve kit comprising:

a valve having a valve body, a flow passage through the valve body and defining a longitudinal axis, a slidable sleeve received in the flow passage and movable in an axial direction between an opened and a closed position, and a part of a valve plug fixedly positioned within the flow passage; and a plurality of selectively interchangeable valve plug end portions each being removably attachable to the valve plug part so as to be arranged to cooperate with the slidable sleeve to open or close the sleeve valve and to change at least one performance or flow characteristic of the sleeve valve, and each having an upstream flow directing surface.

21. An adjustable sleeve valve kit according to claim 20, wherein at least two or more end portions of the plurality of interchangeable end portions have one or more different flow directing surface features so that at least one performance or flow characteristic of the sleeve valve can be adjusted according to which of the two or more end portions is selected and installed in the valve body.

* * * * *

UNITED STATES PATENT AND TRADEMARK OFFICE
CERTIFICATE OF CORRECTION

PATENT NO. : 7,066,447 B2 Page 1 of 1
APPLICATION NO. : 10/657994
DATED : June 27, 2006
INVENTOR(S) : Michael W. McCarty et al.

It is certified that error appears in the above-identified patent and that said Letters Patent is hereby corrected as shown below:

On the title page item (73), "LLC." should be -- LLC --.

In the Specification:

Column 1, line 63, "sight" should be -- site --.

Column 1, line 64, "sight" should be -- site --.

Column 3, line 13, "alterative" should be -- alternative --.

Column 3, line 17, "alterative" should be -- alternative --.

Column 5, line 61, "valve" should be -- valve 20 --.

Column 9, line 14, "design" should be -- designed --.

Signed and Sealed this

Twenty-first Day of October, 2008

JON W. DUDAS
*Director of the United States Patent and Trademark Office*